(12) United States Patent
Kato

(10) Patent No.: US 9,010,268 B2
(45) Date of Patent: Apr. 21, 2015

(54) VEHICLE DISPLAY APPARATUS

(71) Applicant: Alpine Electronics, Inc., Tokyo (JP)

(72) Inventor: Kazunari Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 373 days.

(21) Appl. No.: 13/693,466

(22) Filed: Dec. 4, 2012

(65) Prior Publication Data

US 2013/0186324 A1    Jul. 25, 2013

(30) Foreign Application Priority Data

Jan. 20, 2012  (JP) .................. 2012-010403

(51) Int. Cl.
  *G01D 13/02* (2006.01)
  *G01D 7/04* (2006.01)
  *B60K 37/02* (2006.01)

(52) U.S. Cl.
  CPC ............... *G01D 13/02* (2013.01); *G01D 7/04* (2013.01); *B60K 37/02* (2013.01); *B60K 2350/1064* (2013.01); *B60K 2350/1096* (2013.01)

(58) Field of Classification Search
  USPC ...... 116/28 R, 62.4, 284, 290, 300, 302, 305, 116/DIG. 46; 340/441, 459, 461, 462, 340/691.7, 995.26
  See application file for complete search history.

(56) References Cited

U.S. PATENT DOCUMENTS

2006/0092001 A1    5/2006  Yokota et al.

FOREIGN PATENT DOCUMENTS

| JP | 2009-107482 | | 5/2009 |
|---|---|---|---|
| JP | 2010190606 A | * | 9/2010 |
| JP | 2010216855 A | * | 9/2010 |
| JP | 4648681 | | 12/2010 |
| JP | 2013137282 A | * | 7/2013 |

* cited by examiner

*Primary Examiner* — Laura Martin
*Assistant Examiner* — Irving A Campbell
(74) *Attorney, Agent, or Firm* — Brinks Gilson & Lione

(57) ABSTRACT

A vehicle display apparatus includes a first partition member and a second partition member disposed in front of a display screen of a display panel. Each of the first and second partition members includes a window portion. The first and second partition members may be set in separated positions or in overlapping positions. In the separated positions, the first and second partition members are spaced apart from each other along the display screen. In the overlapping positions, the first partition member is separated forward from the display screen, the second partition member is located between the first partition member and the display screen, and the window portions of the first and second partition members overlap.

19 Claims, 8 Drawing Sheets

VEHICLE DISPLAY APPARATUS

The present application claims priority to Japanese Patent Application Number 2012-010403, filed Jan. 20, 2012, the entirety of which is hereby incorporated by reference.

BACKGROUND OF THE INVENTION

1. Field of the Invention

The present invention relates to a vehicle display apparatus in which partition members, each including a window portion, are disposed in front of a display screen of a liquid crystal display panel or the like. In particular, the present invention relates to a vehicle display apparatus having a structure that allows the partition members to be arranged in various ways.

2. Description of the Related Art

Vehicle display apparatuses, which are mounted in front of a driver's seat of a vehicle, include mechanical gauges such as a speedometer, a tachometer, a fuel gauge, and a coolant temperature indicator. Recently, attempts have been made to mount a display panel, such as a liquid display device, in a vehicle display apparatus and display images of such gauges on a display screen of the display panel.

However, when only images of the gauges are displayed, the gauges do not look stereoscopic because the display screen is flat. As a result, it may be difficult to see the individual gauges intuitively.

Japanese Patent No. 4648681 describes a vehicle display apparatus including a ring-shaped display partition member disposed in front of a liquid crystal display. A lens is fitted into the display partition member. A tachometer is displayed in an area of the liquid crystal display surrounded by the display partition member. The display partition member can be moved in front of the liquid crystal display using a movement mechanism. The display of a tachometer can be moved together with the movement of the display partition member.

Japanese Unexamined Patent Application Publication No. 2009-107482 describes a vehicle display apparatus including two real meters disposed in front of a liquid crystal display. The real meters each include a ring and a pointer that moves in the ring. A scale, to which the pointer points, is displayed in a region of the liquid crystal display surrounded by the ring of the real meter. The real meters can be folded away in the display apparatus so that the real meters may not be seen in front of the liquid crystal display. At that time, various pieces of information other than the scale can be displayed on the liquid crystal display.

As described in Japanese Patent No. 4648681 and Japanese Unexamined Patent Application Publication No. 2009-107482, a display can be made stereoscopic by disposing a ring-shaped three-dimensional member in front of a liquid crystal display panel, and a gauge can be made to be intuitively seen by displaying a scale in a region surrounded by the ring-shaped member.

However, with the vehicle display apparatus described in Japanese Patent No. 4648681, one ring-shaped display partition member disposed in front of the liquid crystal display can move only a small distance in the horizontal direction. Therefore, the displayed contents cannot be changed in various ways.

The vehicle display apparatus described in Japanese Unexamined Patent Application Publication No. 2009-107482 has a structure such that the real meters are folded away in the display device so as to be retracted. Therefore, the display apparatus has a large depth and is impractical.

SUMMARY

Accordingly, it is an object of embodiments of the present invention to provide a vehicle display apparatus with which displayed contents can be changed in various ways. In particular, the vehicle display apparatus can be switched between a mode in which two partition members, for stereoscopically displaying gauges and the like, are disposed so that the two partition members can be seen in front of a display screen and a mode in which the partition members are disposed so that only one of the partition members can be seen in front of the display screen. Moreover, the vehicle display apparatus has a small depth.

According to an embodiment of the present invention, a vehicle display apparatus includes a display panel including a display screen; a first partition member and a second partition member disposed in front of the display screen, each of the first and second partition members including a window portion that partitions a part of the display screen; and a drive mechanism that moves at least one of the first and second partition members in front of the display screen. The first and second partition members can be set in separated positions or in overlapping positions by the drive mechanism. The separated positions are positions in which the first and second partition members are spaced apart from each other along the display screen, and the overlapping positions are positions in which the window portions overlap.

The vehicle display apparatus can be switched between a mode in which two partition members are disposed in front of the display screen and images of stereoscopic gauges and the like surrounded by the window portions are displayed at two positions, and a mode in which the partition members are disposed so as to overlap and an image of a stereoscopic gauge or the like is displayed at one position. It is not necessary to retract the partition members from a space in front of the display screen, because the mode of displaying an image of a gauge or the like at one position can be realized by making the two partition members overlap in front of the display screen. As a result, the structure of the drive mechanism can be simplified, and the depth of the vehicle display apparatus can be reduced.

In the vehicle display apparatus, when the positions of the first and second partition members are changed from the separated positions to the overlapping positions, the first partition member may be moved to an advanced position in which the first partition member is spaced apart from the display screen, and when the first and second partition members are in the overlapping positions, the second partition member may be located between the first partition member in the advanced position and the display screen.

It is preferable that the vehicle display apparatus include a conversion mechanism that converts a moving force of the second partition member into a force that moves the first partition member to the advanced position when the second partition member moves to the overlapping position.

For example, the conversion mechanism may include a rack associated with the second partition member, an intermediate gear rotated by a moving force of the rack, a switching member moved by the intermediate gear, and a conversion cam associated with the switching member, the conversion cam converting a moving force of the switching member into a force that moves the first partition member to the advanced position.

In this case, it is not necessary to use a drive source such as a motor for moving the first partition member forward and backward, because the first partition member is moved to the advanced position by using a moving force of the second partition member.

It is preferable that, when the first partition member is in a retracted position in which the first partition member is located adjacent to the display screen, the first partition member and the second partition member may be both in contact with the display screen or spaced apart from the display screen by the same distance.

In this case, the two partition members can be seen with the same level of stereoscopic sensation when both partition members are disposed in front of the display screen.

The first partition member may be movable along the display screen. The first and second partition members in the overlapping positions may be moved together along the display screen by the drive mechanism.

However, the first partition member may move only between the advanced position and the retracted position in the front-back direction and it is not necessary that the first partition member move in a direction along the display screen.

It is preferable that each of the partition members include a frame surrounding the window portion, and a supporter extending from the frame and connected to the drive mechanism; and the frame be non-transparent or semi-transparent and the supporter be transparent. Moreover, it is preferable that a surface of the supporter be anti-reflection coated.

Therefore, the vehicle display apparatus can be switched between a mode in which two partition members, each including a window portion, are disposed so that the two partition members can be seen in front of a display screen and a mode in which the partition members are disposed so that only one of the partition members can be seen in front of the display screen. As a result, display contents such as gauges and the like can be changed in various ways and, as necessary, contents other than gauges and the like can be displayed. Moreover, it is not necessary that the vehicle display apparatus have a large depth, because it is not necessary to retract the partition members to a position that is spaced apart from the display screen by a large distance.

DESCRIPTION OF THE PREFERRED EMBODIMENTS

Figure 1:
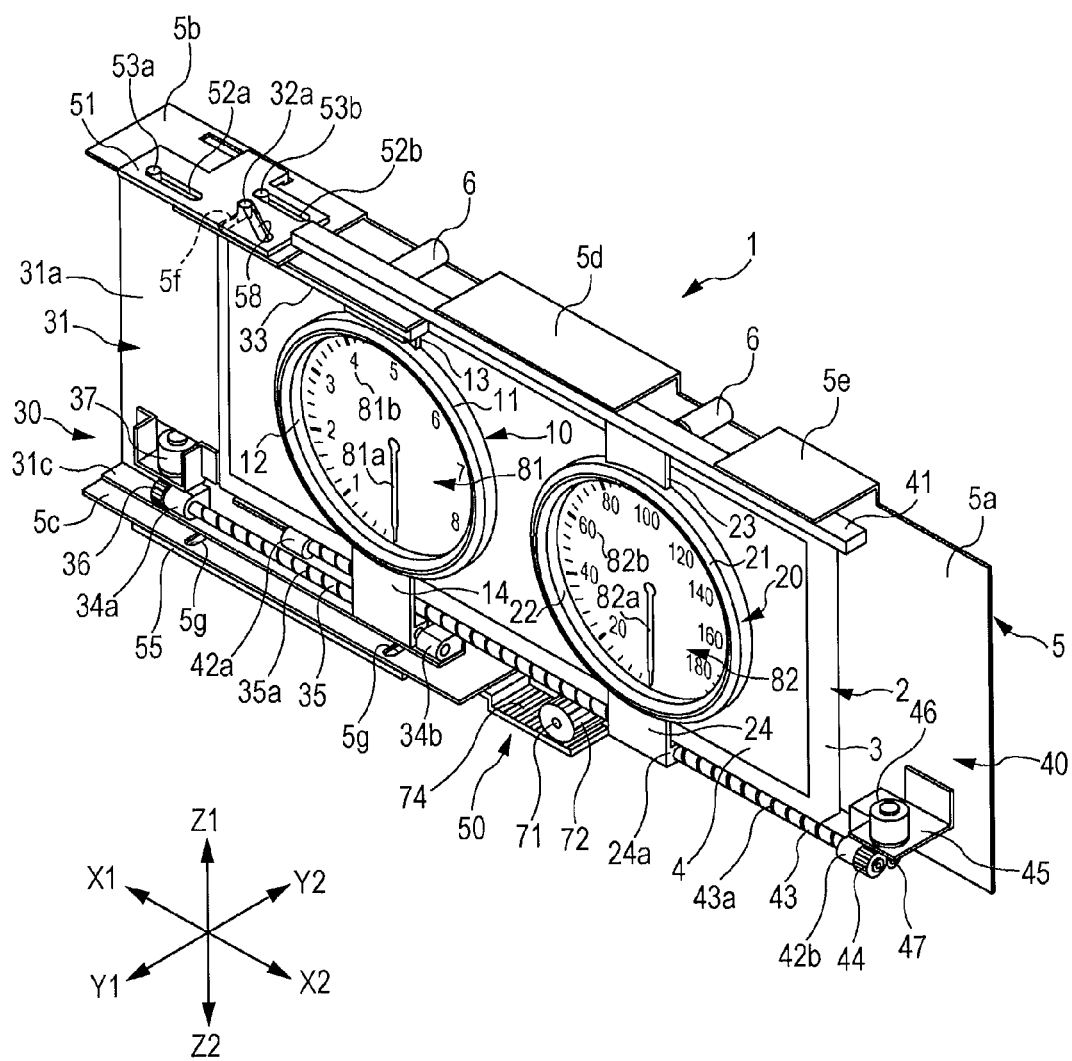
FIG. 1 is a perspective view illustrating a vehicle display apparatus according to an embodiment of the present invention.
Figure 3:
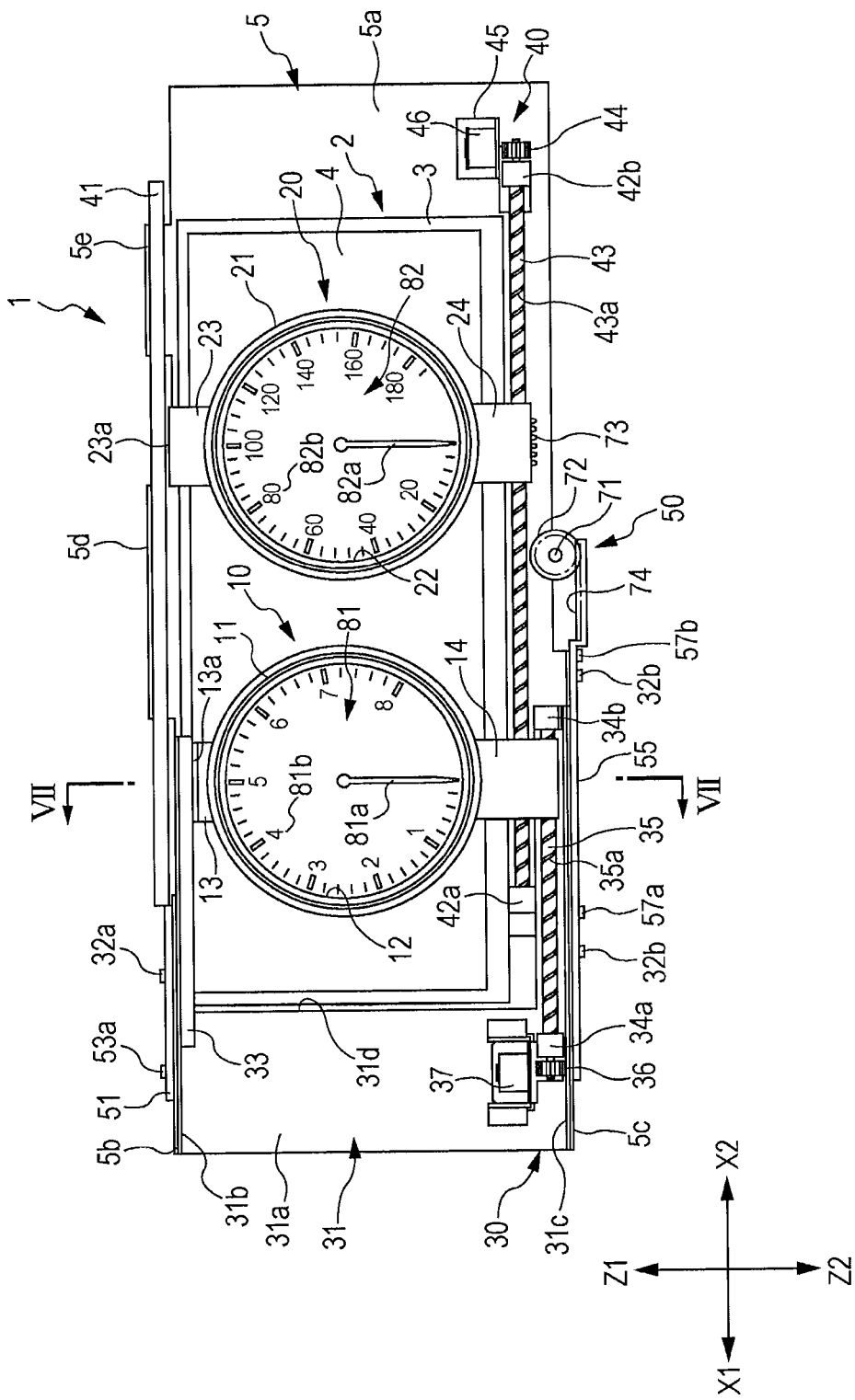
FIG. 3 is a front view illustrating a display mode in which two partition members, which are disposed in front of a display screen, are set in first separated positions.

As illustrated in FIGS. 1, 3, and other figures, a vehicle display apparatus 1 according to an embodiment of the present invention includes a display panel 2. The display panel 2 includes a frame portion 3 and a display screen 4 surrounded by the frame portion 3. The vehicle display apparatus 1 is disposed in front of a driver's seat of a vehicle, such as an automobile, so that the display screen 4 faces in the Y1 direction. The driver's sightline extends in the Y2 direction. The display panel 2 may be a liquid crystal display panel with backlighting, an electroluminescent display panel, or the like.

The vehicle display apparatus 1 is embedded in a dashboard disposed in front of the driver's seat. The display screen 4 is disposed in an opening in the dashboard, while portions of the vehicle display apparatus 1 other than the display screen 4 are embedded in the dashboard. Thus, the driver can see the display screen 4, while the portions of the vehicle display apparatus 1 other than the display screen 4 are hidden so as not be visible from the driver's seat.

In the following description, the Y1, Y2, X1, X2, Z1, and Z2 directions of the vehicle display apparatus 1 will be respectively referred to as the forward, backward, leftward, rightward, upward, and downward directions.

The vehicle display apparatus 1 includes a housing 5. The housing 5 is formed by bending a metal plate. The housing 5 includes a back plate 5a, an upper support plate 5b, and a lower support plate 5c. The back plate 5a extends in the up-down direction (Z1-Z2 direction) and the left-right direction (X1-X2 direction). The upper support plate 5b is disposed on the left side (X1 side) and extends perpendicularly forward (in the Y1 direction) from the upper end of the back plate 5a. The lower support plate 5c is disposed on the left side and extends perpendicularly forward from the lower end of the back plate 5a. The housing 5 further includes two upper support tabs 5d and 5e, which extend forward from the upper end of the back plate 5a.

As illustrated in FIG. 1, a plurality of support brackets 6 are fixed to the back plate 5a of the housing 5, and back portions of the display panel 2 are fixed to the tip ends of the support brackets 6. As a result, the display panel 2 is fixed to the back plate 5a of the housing 5 so as to be spaced forward from the back plate 5a.

A first partition member 10 and a second partition member 20 are disposed in front of the display panel 2. The first partition member 10 includes a ring-shaped frame 11, which surrounds a circular window portion 12. An upper supporter 13 is integrally formed with the frame 11 so as to extend upward from the upper end of the frame 11. A lower supporter 14 is integrally formed with the frame 11 so as to extend downward from the lower end of the frame 11. The second partition member 20 includes a ring-shaped frame 21, which surrounds a circular window portion 22. An upper supporter 23 is integrally formed with the frame 21 so as to extend upward from the upper end of the frame 21. A lower supporter 24 is integrally formed with the frame 21 so as to extend downward from the lower end of the frame 21.

Figure 8:
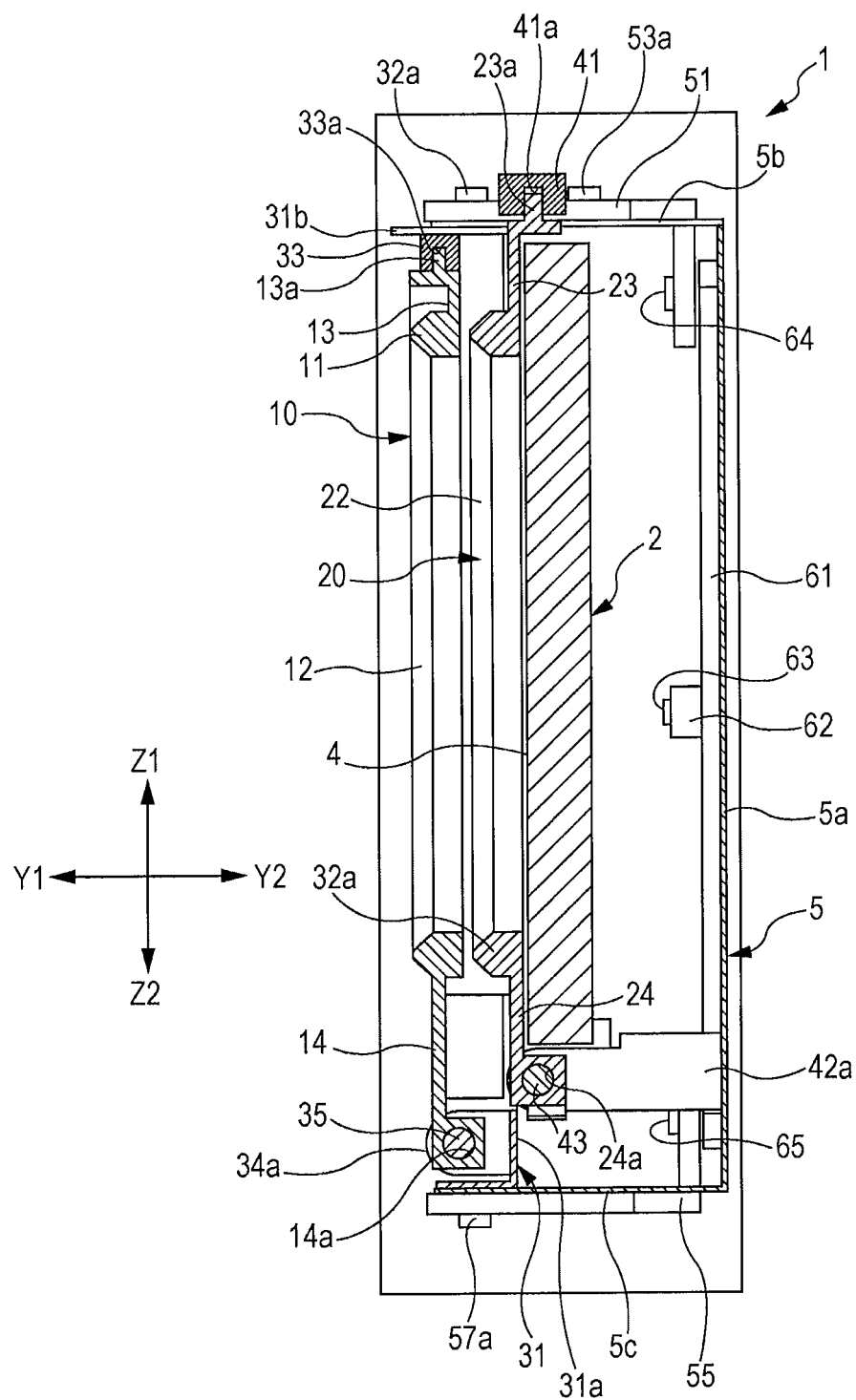
FIG. 8 is a sectional view taken along line VIII-VIII of FIG. 5.

The outside and inside diameters of the frame 11 of the first partition member 10 are respectively the same as those of the frame 21 of the second partition member 20. As illustrated in FIG. 8, the shape and area of the cross section of the frame 11 are respectively the same as those of the frame 21. Therefore, the diameter and area of the opening of the window portion 12 of the first partition member 10 are respectively the same as those of the window portion 22 of the second partition member 20.

The first and second partition members 10 and 20 are made of a transparent synthetic resin material. The surface of the frame 11 of the first partition member 10 and the surface of the frame 21 of the second partition member 20 are coated or electroless plated so as to have, for example, a metallic color. As a result, the frames 11 and 21 are non-transparent or semi-transparent. On the other hand, the upper and lower supporters 13 and 14 of the first partition member 10 and the upper and lower supporters 23 and 24 of the second partition member 20 are not colored. As a result, the supporters 13, 14, 23 and 24, which are made of a transparent synthetic resin, are transparent.

In the present specification, the term "transparent" means that the total light transmittance is, for example, 80% or higher; "non-transparent" means that the total light transmittance is, for example, approximately 0%; and "semi-transparent" means that the total light transmittance is, for example, in the range of about 20 to 60%.

As illustrated in FIG. 3, when the entirety of each of the frames 11 and 21, which are three-dimensional and non-transparent or semi-transparent, is disposed in front of (in the Y1 direction of) the display screen 4, the contents displayed in regions of the display screen 4 in the entire openings of the window portions 12 and 22 can be seen. Moreover, the contents displayed in a region of the display screen 4 outside of the frames 11 and 21 can be seen.

As illustrated in FIG. 3, parts of the upper and lower supporters 13 and 14 of the first partition member 10 and parts of the upper and lower supporters 23 and 24 of the second partition member 20 overlap the display screen 4. However, images displayed in these parts of the display screen 4 can be seen because the upper supporters 13 and 23 and the lower supporters 14 and 24 are transparent. In particular, if the surfaces of the upper supporters 13 and 23 and the lower supporters 14 and 24 facing in the Y1 direction are anti-reflection coated, the upper supporters 13 and 23 and the lower supporters 14 and 24 are almost invisible, and therefore it looks as if only the frame 11 and the frame 21 were present in front of the display screen 4.

Figure 2:
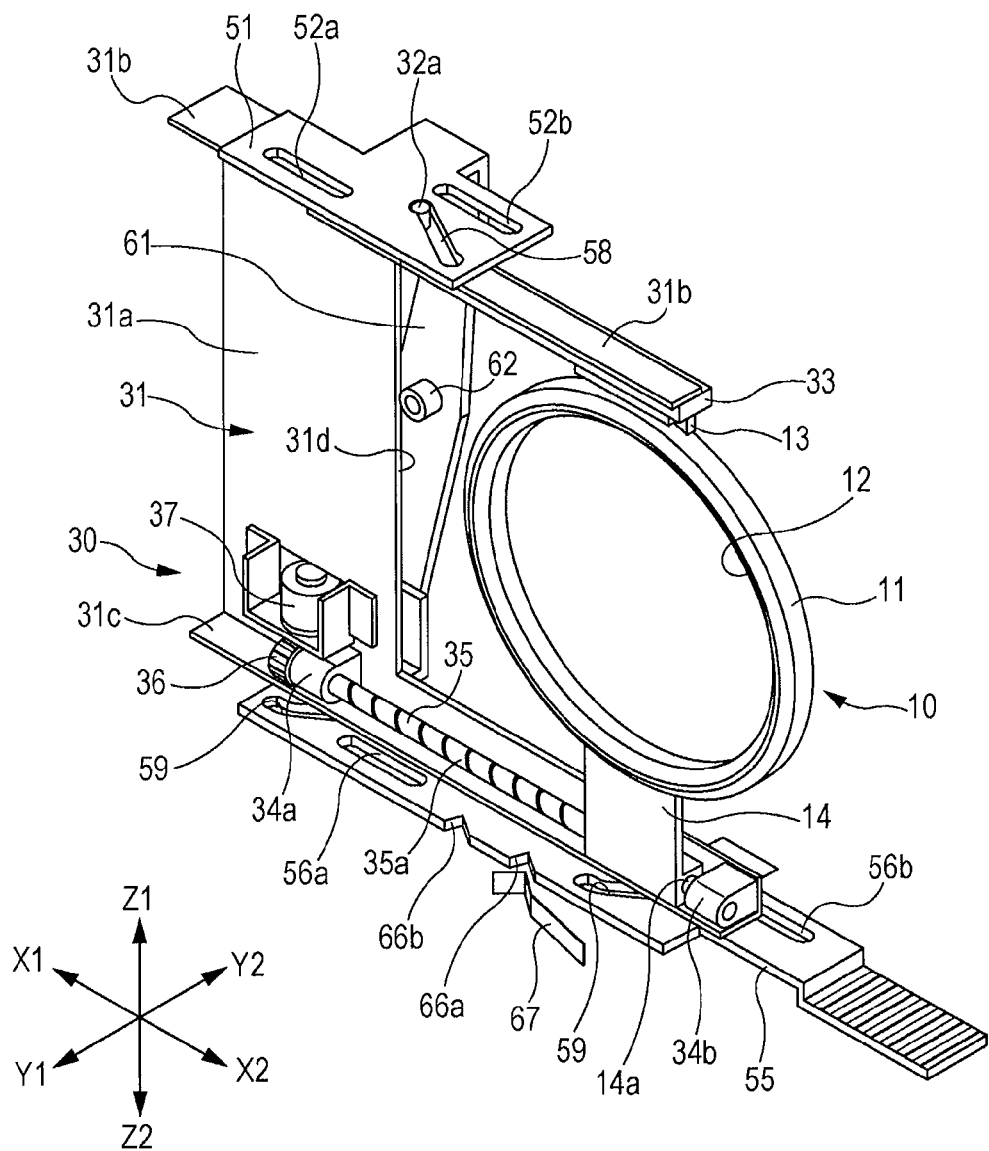
FIG. 2 is a partial perspective view illustrating the structure of a first partition member, a first drive mechanism, and a conversion mechanism of the vehicle display apparatus illustrated in FIG. 1.

The vehicle display apparatus 1 includes a first drive mechanism 30 for moving the first partition member 10. As illustrated in FIGS. 1 and 2, the first drive mechanism 30 includes a movable supporting member 31. The movable supporting member 31 is formed by bending a metal plate and includes a vertical plate portion 31a, an upper end portion 31b, and a lower end portion 31c. The vertical plate portion 31a extends in the left-right direction (X1-X2 direction) and the up-down direction (Z1-Z2 direction). The upper end portion 31b extends perpendicularly forward from the upper end of the vertical plate portion 31a. The lower end portion 31c extends perpendicularly forward from the lower end of the vertical plate portion 31a.

Figure 7:
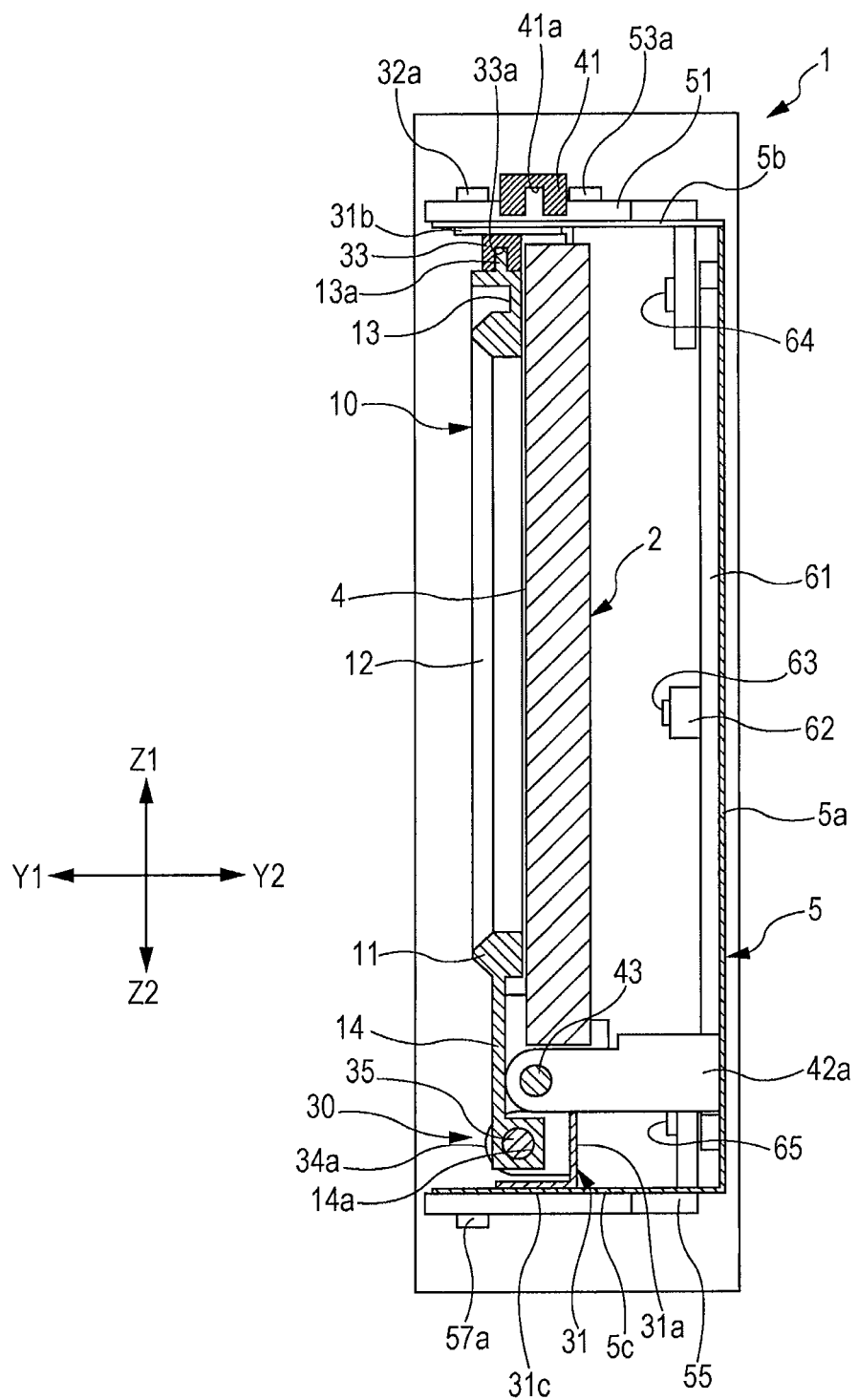
FIG. 7 is a sectional view taken along line VII-VII of FIG. 3.

As illustrated in FIGS. 1 and 7, the upper end portion 31b of the movable supporting member 31 is placed on a lower surface of the upper support plate 5b of the housing 5, and the lower end portion 31c of the movable supporting member 31 is placed on the lower support plate 5c of the housing 5.

As illustrated in FIG. 1, an upper control pin 32a, which protrudes upward, is fixed to the upper end portion 31b of the movable supporting member 31. A support slit 5f, which extends in the front-back direction (Y1-Y2 direction), is formed in the upper support plate 5b of the housing 5. The upper control pin 32a is slidably inserted into the support slit 5f. As illustrated in FIG. 3, a pair of lower control pins 32b, which protrude downward, are fixed to the lower end portion 31c of the movable supporting member 31. As illustrated in FIG. 1, a pair of support slits 5g, which extend in the front-back direction (Y1-Y2 direction), are formed in the lower support plate 5c of the housing 5. The lower control pins 32b are respectively slidably inserted into the support slits 5g.

Thus, the movable supporting member 31 is supported between the upper support plate 5b and the lower support plate 5c of the housing 5 so as to be movable only in the front-back direction (Y1-Y2 direction).

As illustrated in FIG. 2, a rectangular cutout 31d is formed in the vertical plate portion 31a of the movable supporting member 31. A left-side portion of the display panel 2 illustrated in FIG. 1 is located in the cutout 31d. Thus, the movable supporting member 31 can move in the front-back direction without contacting the display panel 2.

As illustrated in FIG. 2, a first guide member 33 is fixed to the lower surface of the upper end portion 31b of the movable supporting member 31. As illustrated in FIG. 7, a guide groove 33a, which faces downward, is formed in the first guide member 33. The guide groove 33a extends linearly in the left-right direction (X1-X2 direction). A sliding protrusion 13a, which protrudes upward, is integrally formed with the upper supporter 13 of the first partition member 10. The sliding protrusion 13a is slidably inserted into the guide groove 33a.

As illustrated in FIG. 2, a pair of bearing members 34a and 34b are fixed to a lower part of the vertical plate portion 31a of the movable supporting member 31. A first screw shaft 35 is rotatably supported by the bearing members 34a and 34b. The axis of the first screw shaft 35 extends in the left-right direction (X1-X2 direction). A helical groove 35a is formed in the surface of the first screw shaft 35. An internally threaded hole 14a is formed in a lower end portion of the lower supporter 14 of the first partition member 10. The first screw shaft 35 extends through the internally threaded hole 14a.

A left end portion of the first screw shaft 35 protrudes leftward from the bearing member 34a on the left side. A worm wheel 36 is fixed to the left end portion. A first motor 37 is fixed to the vertical plate portion 31a of the movable supporting member 31. A worm is fixed to the output shaft of the first motor 37, and the worm is meshed with the worm wheel 36. By driving the first motor 37, which is mounted on the movable supporting member 31, the first partition member 10 can be moved in the left-right direction (X1-X2 direction) on the movable supporting member 31.

The vehicle display apparatus 1 includes a second drive mechanism 40 for moving the second partition member 20. As illustrated in FIG. 1, the second drive mechanism 40 includes a second guide member 41 that is fixed to the lower surface of the upper support tabs 5d and 5e of the housing 5. As illustrated in FIGS. 7 and 8, a guide groove 41a, which faces downward, is formed in the second guide member 41. The guide groove 41a extends linearly in the left-right direction (X1-X2 direction). As illustrated in FIG. 8, a sliding protrusion 23a is integrally formed with an upper end portion of the upper supporter 23 of the second partition member 20. The sliding protrusion 23a is slidably inserted into the guide groove 41a.

As illustrated in FIG. 1, a pair of bearing members 42a and 42b are fixed to the back plate 5a in a lower part of the housing 5. A second screw shaft 43 is rotatably supported by the bearing members 42a and 42b. The axis of the second screw shaft 43 extends in the left-right direction (X1-X2 direction). A helical groove 43a is formed in the surface of the second screw shaft 43. An internally threaded hole 24a is formed in a lower end portion of the lower supporter 24 of the second partition member 20. The second screw shaft 43 extends through the internally threaded hole 24a.

As illustrated in FIG. 1, a right end portion of the second screw shaft 43 protrudes rightward from the bearing member 42b on the right side. A worm wheel 44 is fixed to the right end portion. A support bracket 45 is fixed to the back plate 5a of the housing 5, and a second motor 46 is fixed to the support bracket 45. A worm 47 is fixed to the output shaft of the second motor 46, and the worm 47 is meshed with the worm wheel 44. By driving the second motor 46, the second partition member 20 can be moved in the left-right direction (X1-X2 direction).

As illustrated in FIG. 1, the vehicle display apparatus 1 includes a conversion mechanism 50 that converts a moving force of the second partition member 20 in the left-right direction (X1-X2 direction) into a moving force of the movable supporting member 31 in the front-back direction (Y1-Y2 direction).

As illustrated in FIG. 1, the conversion mechanism 50 includes an upper switching member 51, which is disposed on the upper surface of the upper support plate 5b of the housing 5. A pair of slits 52a and 52b, which extend in the left-right direction, are formed in the upper switching member 51. A pair of support pins 53a and 53b, which protrude upward, are fixed to the upper support plate 5b of the housing 5. The support pins 53a and 53b are respectively inserted into the slits 52a and 52b, and the upper support plate 5b can linearly reciprocate over the upper switching member 51 in the left-right direction (X1-X2 direction).

As illustrated in FIG. 1, a lower switching member 55 is disposed on the lower surface of the lower support plate 5c of the housing 5. As illustrated in FIG. 2, a pair of slits 56a and 56b, which extend linearly in the left-right direction (X1-X2 direction), are formed in the lower switching member 55. As illustrated in FIG. 3, a pair of support pins 57a and 57b, which protrude downward, are fixed to the lower support plate 5c of the housing 5. The support pins 57a and 57b are respectively inserted into the slits 56a and 56b, and the lower switching member 55 can linearly reciprocate under the lower support plate 5c in the left-right direction (X1-X2 direction).

As illustrated in FIGS. 2 and 7, on the left side of the housing 5, a connection lever 61 is disposed in front of the back plate 5a. A bearing portion 62 is disposed on a middle part of the connection lever 61. A support shaft 63, which is fixed to the front surface of the back plate 5a, is inserted into the bearing portion 62. As a result, the connection lever 61 is supported so as to be rotatable around the support shaft 63.

As illustrated in FIG. 7, a connection pin 64 is fixed at an upper end portion of the connection lever 61. The connection pin 64 is rotatably inserted into the upper switching member 51. A connection pin 65 is fixed at a lower end portion of the connection lever 61. The connection pin 65 is rotatably inserted into the lower switching member 55. The upper switching member 51 and the lower switching member 55 are connected to each other through the connection lever 61. In FIG. 2, when the lower switching member 55 moves rightward (in the X2 direction), the connection lever 61 rotates counterclockwise around the support shaft 63 and the upper switching member 51 moves leftward (in the X1 direction). When the lower switching member 55 moves leftward (in the X1 direction), the connection lever 61 rotates clockwise and the upper switching member 51 moves rightward (in the X2 direction).

As illustrated in FIGS. 1 and 2, an upper conversion cam 58 is formed in the upper switching member 51. The upper conversion cam 58 is an inclined slot extending forward (in the Y1 direction) as it extends rightward (in the X2 direction). The upper control pin 32a, which protrudes upward from the upper end portion 31b of the movable supporting member 31, extends through the support slit 5f, which is formed in the upper support plate 5b of the housing 5, and is slidably inserted into the upper conversion cam 58.

As illustrated in FIG. 2, a pair of lower conversion cams 59 are formed in the lower switching member 55. The lower conversion cams 59 are inclined slots extending leftward (in the X1 direction) and forward (in the Y1 direction). The pair of lower control pins 32b, which protrude downward from the lower end portion 31c of the movable supporting member 31, extend through the support slits 5g formed in the lower support plate 5c of the housing 5 and are slidably inserted into the lower conversion cams 59 of the lower switching member 55, respectively.

As illustrated in FIG. 2, a pair of lock recesses 66a and 66b are formed in the lower switching member 55 so as to be spaced apart from each other in the left-right direction. A lock plate spring 67 is fixed to the housing 5, and the tip of the lock plate spring 67 is selectively engageable with the lock recess 66a and the lock recess 66b. The lock recesses 66a and 66b and the lock plate spring 67, which constitute a lock mechanism, are illustrated only in FIG. 2 and are omitted from other figures.

In FIG. 2, the lock recess 66a on the right side is engaged with the lock plate spring 67, and the lower switching member 55 is stopped at a position on the left side (the X1 side). As a result, the upper switching member 51, which is linked to the lower switching member 55 through the connection lever 61, is stopped at a position on the right side (the X2 side). At this time, the upper control pin 32a has been moved in the Y2 direction by the upper conversion cam 58 of the upper switching member 51, the lower control pins 32b (see FIG. 3) have been moved in the Y2 direction by the lower conversion cams 59 of the lower switching member 55, and the movable supporting member 31 and the first partition member 10 mounted thereon are in retracted positions in which they are located adjacent to the display screen 4.

When the lower switching member 55 moves rightward (in the X2 direction), a moving force of the lower switching member 55 is transmitted to the upper switching member 51 through the connection lever 61, and thereby the upper switching member 51 moves leftward (in the X1 direction). When the lock recess 66b on the left side becomes engaged with the lock plate spring 67, the lower switching member 55 is stopped, and the upper switching member 51 is stopped. During this time, the upper control pin 32a is moved in the Y1 direction by the upper conversion cam 58 of the upper switching member 51, and the lower control pins 32b are moved in the Y1 direction by the lower conversion cams 59 of the lower switching member 55. As a result, the movable supporting member 31 and the first partition member 10 mounted thereon are in advanced positions in which they are spaced forward from the display screen 4.

As illustrated in FIGS. 1 and 3, a support shaft 71 is fixed to a front surface of the back plate 5a of the housing 5. An intermediate gear 72, which is a pinion, is rotatably supported by the support shaft 71. A second rack 73 is disposed at a lower end portion of the lower supporter 24 of the second partition member 20, and a first rack 74 is disposed at a right end portion of the lower switching member 55. As illustrated in FIGS. 1 and 3, the first rack 74 is constantly meshed with the intermediate gear 72.

While the second partition member 20 is moving leftward (in the X1 direction), the second rack 73 becomes meshed with the intermediate gear 72 and thereby the intermediate gear 72 is rotated. As a result, the moving force is transmitted to the first rack 74 and the lower switching member 55 is moved rightward.

Next, the operation of the vehicle display apparatus 1 will be described.

The vehicle display apparatus 1 includes a display controller and a switching controller. The display controller changes an image displayed on the display screen 4 of the display panel 2. The switching controller controls the motor 37 of the first drive mechanism and the motor 46 of the second drive mechanism 40. A main controller controls the display controller and the switching controller so that operations performed by these controllers are linked to each other.

In FIGS. 1 and 2, the first partition member 10 is located on the left side (X1 side) and the second partition member 20 is located on the right side (X2 side). The first and second partition members 10 and 20 are set in first separated positions. When the first and second partition members 10 and 20 are in the first separated positions, the entire region of the window portion 12 of the first partition member 10 overlaps the display screen 4, and the entire region of the window portion 22 of the second partition member 20 overlaps the display screen 4.

As illustrated in FIG. 2, when the first and second partition members 10 and 20 are in the first separated positions, the lock recess 66a on the right side, which is formed in the lower switching member 55 of the first drive mechanism 30, is engaged with the lock plate spring 67, and the lower switching member 55 is locked after being moved leftward. The upper switching member 51, which is connected to the lower switching member 55 through the connection lever 61, is locked after being moved rightward so that it cannot be moved. Therefore, the movable supporting member 31 is held in a retracted position after being moved backward in the Y2 direction by the lower conversion cams 59 of the lower switching member 55 and the upper conversion cam 58 of the upper switching member 51.

At this time, as illustrated in FIG. 7, the frame 11 of the first partition member 10, which is mounted on the movable supporting member 31, is in a retracted position in which the frame 11 is in contact with or slightly spaced forward from the surface of the display screen 4.

The second partition member 20 moves along the display screen 4 only in the left-right direction (X1-X2 direction). The frame 21 of the second partition member 20 is also in a position in which the frame 21 is in contact with or slightly spaced forward from the surface of the display screen 4. In a case where the frame 11 of the first partition member 10 and the frame 21 of the second partition member 20 are spaced forward from the display screen 4, the distance between the frame 11 and the display screen 4 is the same as the distance between the frame 21 and the display screen 4.

When the first and second partition members 10 and 20 are in the first separated positions, the movable supporting member 31 is retracted in the Y2 direction. Even at this time, rotation of the second screw shaft 43 is not hindered, because the lower supporter 14 of the first partition member 10 is slightly spaced from the second screw shaft 43 as illustrated in FIG. 7. Moreover, the first screw shaft 35 and the second screw shaft 43 are spaced apart from each other in the up-down direction, so that they do not interfere with each other.

As illustrated in FIGS. 1 and 3, when the first and second partition members 10 and 20 are in the first separated positions, the display controller controls the contents displayed on the display screen 4 of the display panel 2 so that a gauge image 81 is displayed in the window portion 12 of the first partition member 10 and a gauge image 82 is displayed in the window portion 22 of the second partition member 20. The gauge image 82, which is displayed in the window portion 22, represents a speedometer and includes a pointer image 82a that rotates and a speed-scale image 82b to which the pointer image 82a points. The gauge image 81, which is displayed in the window portion 12, represents an engine tachometer and includes a pointer image 81a that rotates and an rpm-scale image 81b to which the pointer image 81a points.

As illustrated in FIGS. 1 and 3, the frame 11, which has a three-dimensional shape and surrounds the displayed content, is disposed in front of the gauge image 81; and the frame 21, which has a three-dimensional shape and surrounds the displayed content, is disposed in front of the gauge image 82. As a result, a driver can have a visual sensation as if the driver were looking at mechanical gauges and the like having three-dimensional shapes.

In regions outside of the frame 11 of the first partition member 10 and the frame 21 of the second partition member 20, other gauges and the like, such as a coolant temperature indicator and a fuel gauge, and images representing other driving information can be displayed on the display screen 4.

As illustrated in FIGS. 1 and 3, when the first and second partition members 10 and 20 are in the first separated positions, the distance between the frame 11 and the frame 21 in the left-right direction can be changed by controlling the first motor 37 and the second motor 46 with the switching controller. For example, the distance between the frame 11 and the frame 21 can be increased and decreased by operating an operation unit (not shown). At this time, operations of the switching controller and the display controller are linked to each other so that the gauge image 81 can be located in the window portion 12 while the frame 11 is moving and so that the gauge image 82 can be located in the window portion 22 while the frame 21 is moving.

Figure 6:
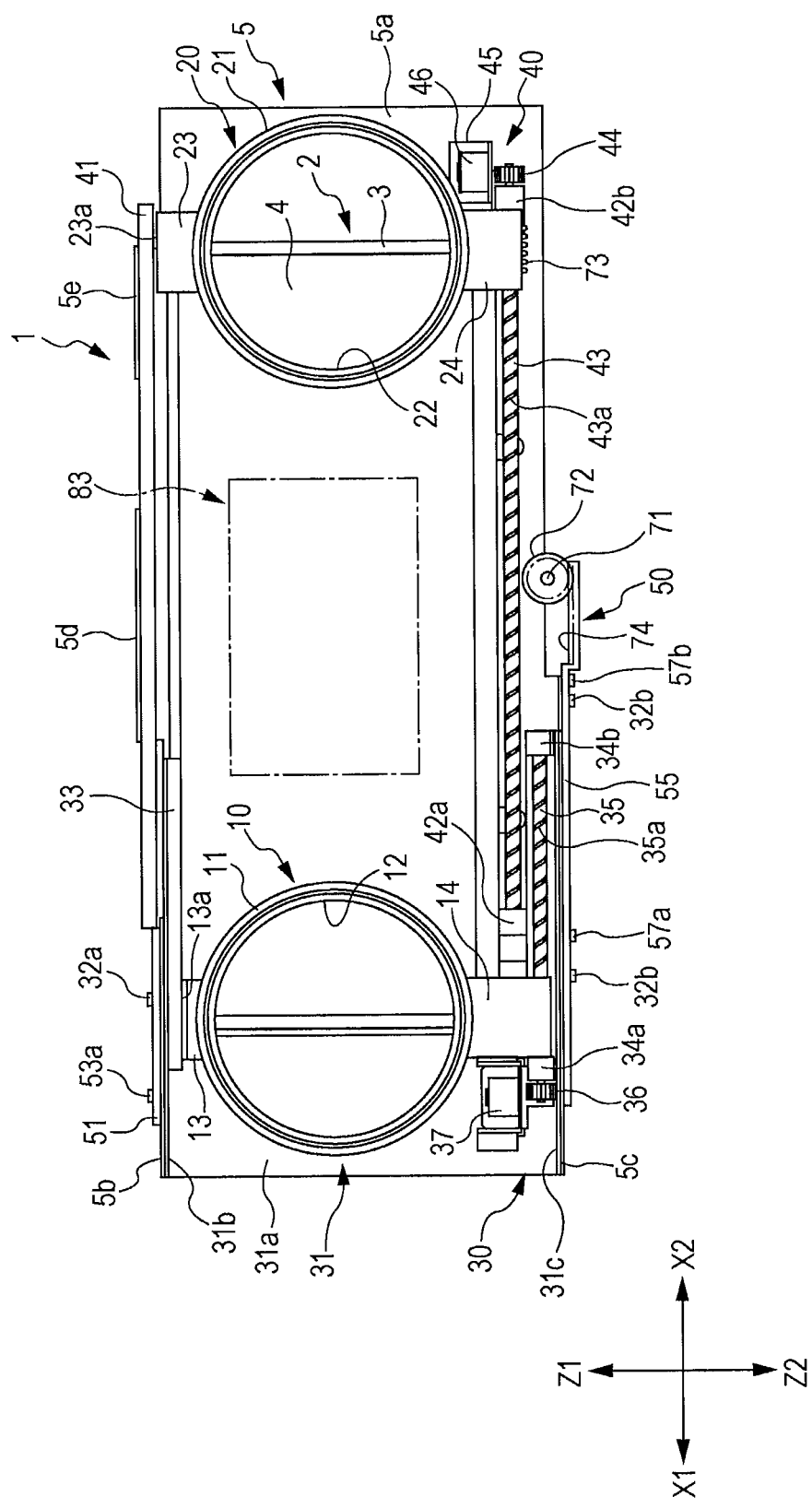
FIG. 6 is a front view illustrating a display mode in which the two partition members are set in second separated positions, in which they are maximally spaced apart from each other.

FIG. 6 illustrates a state in which the first and second partition members 10 and 20 are in second separated positions. The second separated positions are set by moving the first partition member 10 leftward by rotating the first screw shaft 35 with the first motor 37 and by moving the second partition member 20 rightward by rotating the second screw shaft 43 with the second motor 46.

In the second separated positions, the right half of the frame 11 of the first partition member 10 is located in front of the display screen 4 and the left half of the frame 11 is hidden in the dashboard or the like. The left half of the frame 21 of the second partition member 20 is located in front of the display screen 4 and the right half of the frame 21 is hidden in the dashboard or the like.

When the second separated positions are set, the display controller causes various pieces of information that are necessary for driving the vehicle to be displayed in a display region 83 in the middle of the display screen 4. For example, an image of a number representing the speed of the vehicle is displayed. In the right half of the window portion 12 of the first partition member 10 and in the left half of the window portion 22 of the second partition member 20, other gauges and the like, such as a coolant temperature indicator and a fuel gauge, and images representing other pieces of information are displayed.

Figure 4:
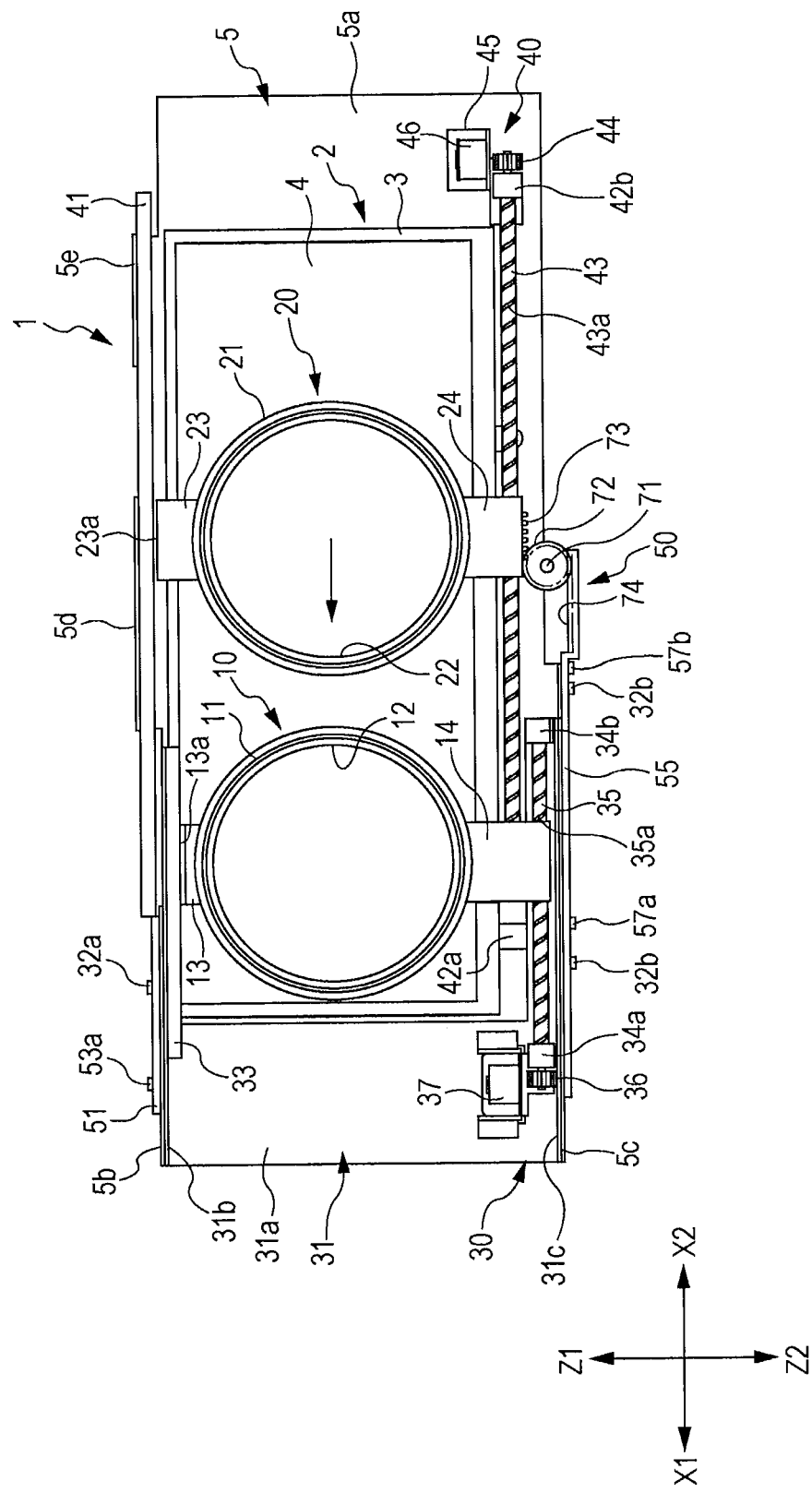
FIG. 4 is a front view illustrating an operation by which the two partition members are made close to each other.
Figure 5:
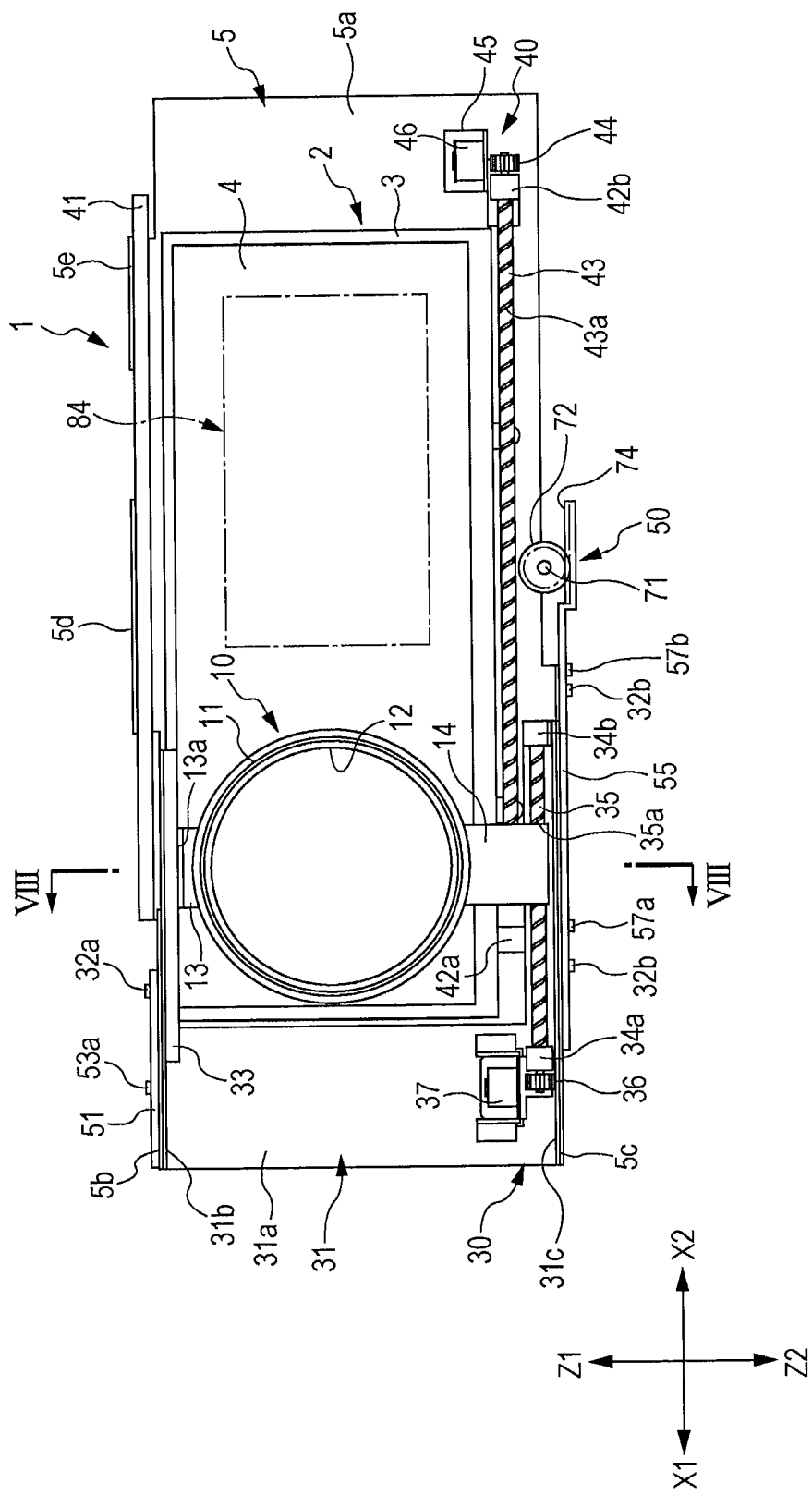
FIG. 5 is a front view illustrating a display mode in which the two partition members are set in overlapping positions.

FIG. 5 illustrates a state in which the first and second partition members 10 and 20 are set in overlapping positions. FIG. 4 illustrates a switching operation with which the positions of the first and second partition members 10 and 20 are changed from the first separated positions illustrated in FIG. 3 to the overlapping positions illustrated in FIG. 5.

When setting the overlapping positions, the first partition member 10 is stopped at a certain position on the left side or on the right side. For example, as illustrated in FIG. 4, the first partition member 10 is moved to the left side of the display screen 4 by driving the first motor 37 and then stopped. Next, the second partition member 20 is moved leftward by rotating the second screw shaft 43 by driving the second motor 46. As illustrated in FIG. 4, while the second partition member 20 is moving leftward, the second rack 73, which is disposed on the lower supporter 24 of the second partition member 20, becomes meshed with the intermediate gear 72, and the intermediate gear 72 is rotated counterclockwise as a result of receiving a moving force of the second partition member 20, which is oriented leftward (in the X1 direction).

When the intermediate gear 72 rotates counterclockwise, the first rack 74, which is meshed with the intermediate gear 72, is pulled in the X2 direction, and the lower switching member 55 is moved rightward (in the X2 direction). Moreover, the upper switching member 51, which is connected to the lower switching member 55 through the connection lever 61, is moved leftward (in the X1 direction). The movable supporting member 31 is moved forward in the Y1 direction by the lower conversion cams 59 of the lower switching member 55 and the upper conversion cam 58 of the upper switching member 51. As a result, as illustrated in FIG. 8, the frame 11 of the first partition member 10, which is mounted on the movable supporting member 31, is set in the advanced position, in which the frame 11 is spaced forward from the surface of the display screen 4.

When the lower switching member 55 moves rightward (in the X2 direction), the lock recess 66b on the left side, which is illustrated in FIG. 2, becomes engaged with the lock plate spring 67 and the lower switching member 55 becomes locked. Thus, the frame 11 of the first partition member 10 is held in the advanced position, in which the frame 11 is spaced forward from the display screen 4.

As the second motor 46 continues rotating, the second partition member 20 moves leftward and, as illustrated in FIGS. 5 and 8, the second partition member 20 enters a space between the first partition member 10 in the advanced position and the display screen 4, and the first partition member 20 stops at a position at which the second partition member 10 completely overlaps the second partition member 20. As illustrated in FIG. 5, when the first and second partition members 10 and 20 are in the overlapping positions, the frame 11 of the first partition member 10 and the frame 21 of the second partition member 20 overlap, and the window portion 12 of the first partition member 10 and the window portion 22 of the second partition member 20 overlap.

As illustrated in FIG. 5, when the first and second partition members 10 and 20 are in the overlapping positions, it looks as if one ring-shaped frame were present in front of the display screen 4. At this time, the display controller performs changes an image displayed on the display screen 4 so that an image of, for example, a speedometer or an engine tachometer is displayed in the overlapping window portions 12 and 22. Images representing other pieces of information are displayed in a large region 84 on the right side of the display screen 4. For example, an image for vehicle navigation and an image of a number representing the speed of the vehicle are displayed in the region 84.

As illustrated in FIG. 5, by driving the first motor 37 and the second motor 46 while the first and second partition members 10 and 20 overlap each other, the frame 11 and the frame 21 can be moved together in the left-right direction in the overlapping state.

The first separated positions illustrated in FIG. 3, the second separated positions illustrated in FIG. 6, and the overlapping positions illustrated in FIG. 5 may be selected by a driver or a passenger by operating an operation unit. Alternatively, the positions may be automatically changed by the main controller when the speed of the vehicle or the condition of a road along which the vehicle travels changes.

In the embodiment described above, the two partition members 10 and 20 are disposed in front of the display screen 4. Alternatively, three or more partition members may be disposed in front of the display screen 4, and the positions of two of the partition members may be changed between the separated positions and the overlapping positions.

The shape of each of the partition members is not limited to a ring-like shape. Alternatively, the shape of the frame of each partition member may be a polygonal shape, such as a quadrangular shape, an elliptical shape, or an irregular shape composed of a continuous curve.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims

What is claimed is:

1. A vehicle display apparatus comprising:
   a display panel including a display screen;
   a first partition member and a second partition member disposed in front of the display screen, each of the first and second partition members including a window portion that partitions a part of the display screen; and
   a drive mechanism that moves at least one of the first and second partition members in front of the display screen,
   wherein the first and second partition members are set in separated positions or in overlapping positions by the drive mechanism, the separated positions being positions in which the first and second partition members are spaced apart from each other along the display screen, the overlapping positions being positions in which the window portions overlap.

2. The vehicle display apparatus according to claim 1, wherein, when the positions of the first and second partition members are changed from the separated positions to the overlapping positions, the first partition member is moved to an advanced position in which the first partition member is spaced apart from the display screen, and when the first and second partition members are in the overlapping positions, the second partition member is located between the first partition member in the advanced position and the display screen.

3. The vehicle display apparatus according to claim 2, further comprising:
   a conversion mechanism that converts a moving force of the second partition member into a force that moves the first partition member to the advanced position when the second partition member moves to the overlapping position.

4. The vehicle display apparatus according to claim 3, wherein the conversion mechanism includes
   a rack associated with the second partition member,
   an intermediate gear rotated by a moving force of the rack,
   a switching member moved by the intermediate gear, and a conversion cam disposed in the switching member, the conversion cam converting a moving force of the switching member into a force that moves the first partition member to the advanced position.

5. The vehicle display apparatus according to claim 2, wherein, when the first partition member is in a retracted position in which the first partition member is located adjacent to the display screen, the first partition member and the second partition member are both in contact with the display screen or spaced apart from the display screen by the same distance.

6. The vehicle display apparatus according to claim 2, wherein the first partition member is movable along the display screen.

7. The vehicle display apparatus according to claim 6, wherein the first and second partition members in the overlapping positions can be moved together along the display screen by the drive mechanism.

8. The vehicle display apparatus according to claim 1, wherein each of the partition members includes
a frame surrounding the window portion, and
a supporter extending from the frame and connected to the drive mechanism, and
wherein the frame is non-transparent or semi-transparent and the supporter is transparent.

9. The vehicle display apparatus according to claim 8, wherein a surface of the supporter is anti-reflection coated.

10. The vehicle display apparatus according to claim 2, further comprising:
a lock mechanism that holds the first partition member in the advanced position.

11. A vehicle display apparatus comprising:
a display panel including a display screen;
a first partition member and a second partition member disposed in front of the display screen, each of the first and second partition members including a window portion that partitions a part of the display screen; and
a drive mechanism that moves at least one of the first and second partition members in front of the display screen,
wherein the first and second partition members are set in separated positions or in overlapping positions by the drive mechanism, the separated positions being positions in which the first and second partition members are spaced apart from each other along the display screen, the overlapping positions being positions in which the window portions overlap, and
wherein, when the positions of the first and second partition members are changed from the separated positions to the overlapping positions, the first partition member is moved to an advanced position in which the first partition member is spaced apart from the display screen, and the second partition member is moved along the display screen into a space between the first partition member in the advanced position and the display screen.

12. The vehicle display apparatus according to claim 11, further comprising:
a conversion mechanism that converts a moving force of the second partition member into a force that moves the first partition member to the advanced position when the second partition member moves to the overlapping position.

13. The vehicle display apparatus according to claim 12, wherein the conversion mechanism includes
a rack associated with the second partition member,
an intermediate gear rotated by a moving force of the rack,
a switching member moved by the intermediate gear, and
a conversion cam disposed in the switching member, the conversion cam converting a moving force of the switching member into a force that moves the first partition member to the advanced position.

14. The vehicle display apparatus according to claim 11, wherein, when the first partition member is in a retracted position in which the first partition member is located adjacent to the display screen, the first partition member and the second partition member are both in contact with the display screen or spaced apart from the display screen by the same distance.

15. The vehicle display apparatus according to claim 11, wherein the first partition member is movable along the display screen.

16. The vehicle display apparatus according to claim 15, wherein the first and second partition members in the overlapping positions can be moved together along the display screen by the drive mechanism.

17. The vehicle display apparatus according to claim 11, wherein each of the partition members includes
a frame surrounding the window portion, and
a supporter extending from the frame and connected to the drive mechanism, and
wherein the frame is non-transparent or semi-transparent and the supporter is transparent.

18. The vehicle display apparatus according to claim 17, wherein a surface of the supporter is anti-reflection coated.

19. The vehicle display apparatus according to claim 11, further comprising:
a lock mechanism that holds the first partition member in the advanced position.

* * * * *